United States Patent
Laskawiec et al.

(10) Patent No.: US 11,182,368 B2
(45) Date of Patent: Nov. 23, 2021

(54) INDEXING DATA IN A TABLE BASED ON DATA USAGE STATISTICS

(71) Applicant: International Business Machines Corporation, Armonk, NY (US)

(72) Inventors: Andrzej Laskawiec, Cracow (PL); Michal Bodziony, Cracow (PL); Marcin Filip, Cracow (PL); Lukasz Stanislaw Studzienny, Cracow (PL); Tomasz Zatorski, Cracow (PL); Marcin Luczynski, Cracow (PL); Monika Piatek, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 16/580,533

(22) Filed: Sep. 24, 2019

(65) Prior Publication Data
US 2021/0089508 A1    Mar. 25, 2021

(51) Int. Cl.
*G06F 16/22* (2019.01)
*G06F 16/215* (2019.01)
*G06F 11/34* (2006.01)
*G06F 16/23* (2019.01)

(52) U.S. Cl.
CPC ...... *G06F 16/2272* (2019.01); *G06F 11/3428* (2013.01); *G06F 16/215* (2019.01); *G06F 16/2282* (2019.01); *G06F 16/2393* (2019.01)

(58) Field of Classification Search
CPC .............. G06F 16/221; G06F 16/2272; G06F 16/2393; G06F 16/22; G06F 16/2282; G06F 16/2293

USPC .......................................................... 707/741
See application file for complete search history.

(56) References Cited

U.S. PATENT DOCUMENTS

| | | | |
|---|---|---|---|
| 8,959,057 B2 | 2/2015 | Ganesh | |
| 9,430,473 B1 | 8/2016 | Li | |
| 9,805,077 B2* | 10/2017 | Draese | G06F 16/221 |
| 10,061,789 B2 | 8/2018 | James | |
| 2014/0279838 A1* | 9/2014 | Tsirogiannis | G06F 16/22 707/603 |
| 2017/0031990 A1 | 2/2017 | Chakkappen | |

* cited by examiner

*Primary Examiner* — Hung T Vy
(74) *Attorney, Agent, or Firm* — David K. Mattheis; Maeve M. Carpenter

(57) ABSTRACT

Aspects of the present invention disclose a method for ordering rows of a table based on access statistics. The method includes one or more processors adding a respective tracking mechanism to the attribute of each respective instance of the set of rows of the table of the database. The method further includes adding a tracking mechanism to the respective instances of the set of rows. The method further includes gathering access data of the respective tracking mechanism of the attribute of each respective instance of the set of rows. The method further includes determining each respective instance of an attribute value that corresponds to the access data of the respective tracking mechanism of each respective instance of the set of rows. The method further includes ordering each respective instance of the set of rows of the table based at least in part on the respective instances of the attribute values.

20 Claims, 4 Drawing Sheets

INDEXING DATA IN A TABLE BASED ON DATA USAGE STATISTICS

BACKGROUND OF THE INVENTION

The present invention relates generally to the field of database systems and more particularly to optimization of queries.

In recent years, with the increase in advances in machine learning and artificial intelligence demand for database engines that can maintain and govern large data sets is high. A database engine is the underlying software component that a database management system uses to create, read, update, and delete data from a database. Some database engines can track and store creation and modification times of an attribute of a table of a database, while other database engines can store the last access time of a table at the table level.

A database index is a data structure of a database that improves the speed of data retrieval operations on a database table at the cost of additional writes and storage space to maintain the index data structure. Also, many types of indexes share the common property that they reduce the need to examine every entry when running a query. Database indexes can speed up data access, but they consume space in the database, and must be updated each time the data is altered. Database indexes therefore can speed data access, but slow data maintenance.

In machine learning and artificial intelligence an important aspect in model creation and training is data quality. Data quality and data cleansing is of paramount significance for machine learning algorithms. If data is not cleansed enough (e.g., includes stale data) machine learning algorithm may not be able to learn (i.e., to converge to minimum of a cost function) or the machine learning algorithm can be required to use more training examples, which results in extended learning time and increased computing resources consumption.

SUMMARY

Aspects of the present invention disclose a method, computer program product, and system. The method includes one or more processors adding an attribute to each respective instance of a set of rows within a table of a database. The method further includes adding a respective tracking mechanism to the attribute of each respective instance of the set of rows of the table of the database. The method further includes gathering access data of the respective tracking mechanism of the attribute of each respective instance of the set of rows of the table of the database. The method further includes determining each respective instance of an attribute value that corresponds to the access data of the respective tracking mechanism of each respective instance of the set of rows of the table of the database. The method further includes ordering each respective instance of the set of rows of the table based at least in part on the respective instances of the attribute values. Embodiments of the present invention order rows of a table based on access statistics of the row of the table improve data arrangement structures of a table by providing an efficient additional method to manipulate (e.g., deletion, updating, retrieval, etc.) data of the database.

Additionally, one aspect of the present invention discloses a method, computer program product, and system for gathering access data of the respective tracking mechanism of the attribute of each respective instance of an access to each respective instance of a set of rows of the table of the database, wherein the identified access includes an executed database command instruction that includes a selection from a group consisting of: modification functions, creation functions, and reading functions. Embodiments of the present invention improve a database table by providing an efficient method to identify stale data (i.e., data not accessed for extended period of time) of the database.

Additionally, another aspect of the present invention discloses a method, computer program product, and system for adding the respective tracking mechanism to of the attribute of each respective instance of the set of rows of the table of the database. The method includes one or more processors the attribute of each respective instance of the set of rows within the table of the database to include a histogram. The method further includes one or more processors selecting the respective tracking mechanism from a group consisting of: index, clustering key, and materialized view. Embodiments of the present invention improve a database engine by providing the ability to capture access statistics at row level as opposed to only at a table level.

DETAILED DESCRIPTION

Embodiments of the present invention allow for optimization of queries in a database system. Embodiments of the present invention track creation, modification, and reading access of row of a table. Embodiments of the present invention allow for ordering of two or more rows of a table based on tracked data of the table. In another embodiment of the present invention the most frequently used rows of a table are provided via query.

Some embodiments of the present invention recognize that challenges exist in database engine's ability to identify and remove stale data of a table of a database, due to limitations of only being capable of capturing creation and modification times of a row of the table. Furthermore, database engines capable of capturing an access time (e.g., read) of the row of the table only provide an access time at a table level (e.g., object level, document level, etc.), which excludes reference to access times of individual rows. Various embodiments of the present invention solve this challenge by adding attributes to a table that store data access statistics (e.g., data corresponding to modification operations, reading operations, etc.).

Embodiments of the present invention improve data arrangement structures of a table by providing an efficient additional method to manipulate (e.g., deletion, updating, retrieval, etc.) data of the database. Embodiments of the present invention improve database performance by reducing query time/cost. Embodiments of the present invention increase database storage resources by providing an efficient method to identify stale data (i.e., data not accessed for extended period of time) of the database.

Implementation of embodiments of the invention may take a variety of forms, and exemplary implementation details are discussed subsequently with reference to the Figures.

Figure 1:
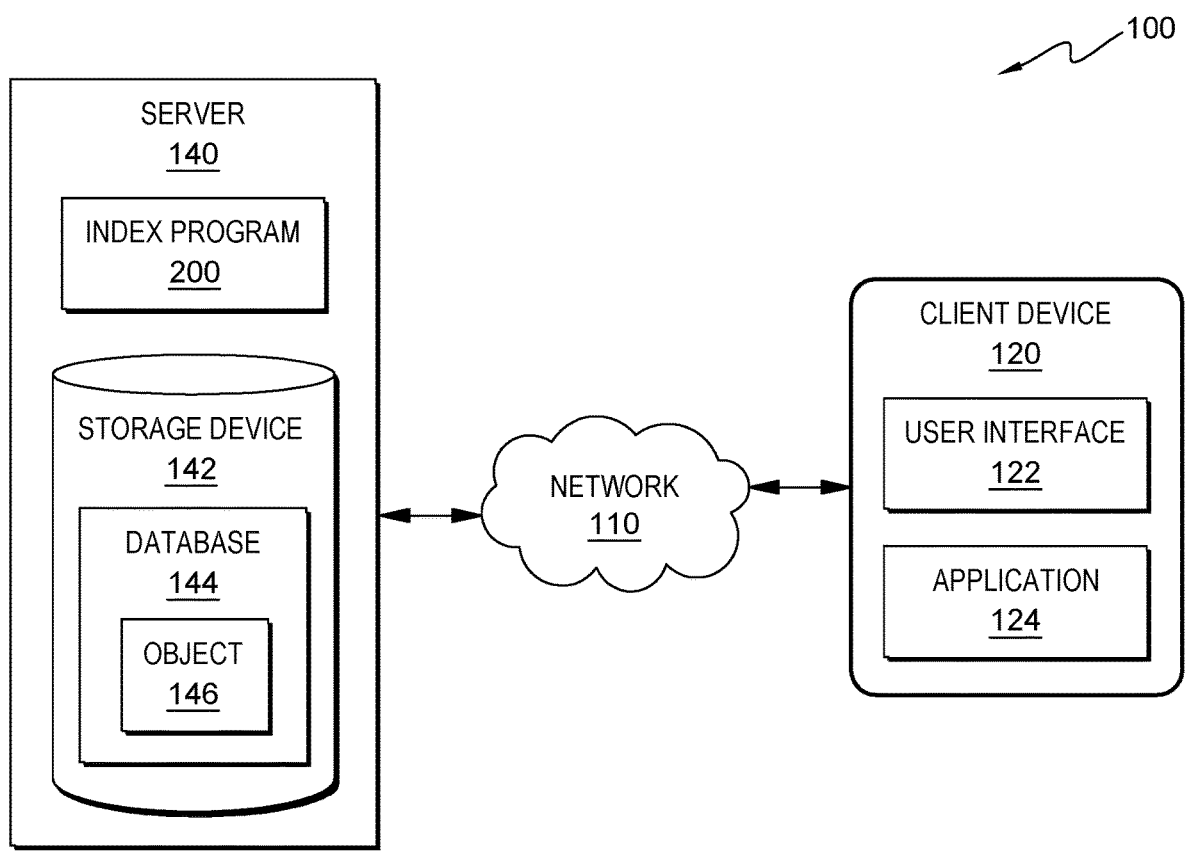
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as server 140 and client device 120, that may include information associated with system users, content, or information a user wishes not to be processed. Information associated with system users includes identifying information or sensitive information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on information associated with system users.

Index program 200 enables the authorized and secure processing of information associated with system users. Index program 200 provides informed consent, with notice of the collection of information associated with system users, allowing the user to opt in or opt out of processing information associated with system users. Consent can take several forms. Opt-in consent can impose on the user to take an affirmative action before information associated with system users is processed. Alternatively, opt-out consent can impose on the user to take an affirmative action to prevent the processing of information associated with system users before the information is processed. Index program 200 provides information associated with system users and the nature (e.g., type, scope, purpose, duration, etc.) of the processing. Index program 200 provides the user with copies of stored information associated with system users. Index program 200 allows the correction or completion of incorrect or incomplete information associated with system users. Index program 200 allows the immediate deletion of information associated with system users.

An embodiment of data processing environment 100 includes client device 120, and server 140, all interconnected over network 110. In one embodiment, client device 120 and server 140 communicate through network 110. Network 110 can be, for example, a local area network (LAN), a telecommunications network, a wide area network (WAN), such as the Internet, or any combination of the three, and include wired, wireless, or fiber optic connections. In general, network 110 can be any combination of connections and protocols, which will support communications between client device 120 and server 140, in accordance with embodiments of the present invention. In another embodiment, client device 120 communicates with server 140 over network 110. For example, a query of a user is transmitted from a laptop (e.g., client device 120) via a local access network (LAN) (e.g., network 110) to a database server (e.g., server 140).

In various embodiments of the present invention, client device 120 may be a workstation, personal computer, digital video recorder (DVR), media player, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 4, in accordance with embodiments of the present invention.

Client device 120 includes a processor, user interface 122, and application 124. User interface 122 is a program that provides an interface between a user of client device 120 and a plurality of applications that reside on client device 120. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a computer program designed to run on client device 120. An application frequently serves to provide a user with similar services accessed on personal computers (e.g., web browser, playing music, or other media, etc.). In one embodiment, a user utilizes application 124 of client device 120 to access data of server 140. For example, application 124 is a command prompt window (e.g., application 124) of a personal computer (client device 120) that a user can utilize to transmit queries and receive data of a database (e.g., server 140). In another embodiment, a user utilizes application 124 of client device 120 to register with index program 200.

In various embodiments of the present invention, server 140 may be a desktop computer, a computer server, or any other computer systems, known in the art. In certain embodiments, server 140 represents computer systems utilizing clustered computers and components (e.g., database server computers, application server computers, etc.), which act as a single pool of seamless resources when accessed by elements of data processing environment 100. In general, server 140 is representative of any electronic device or combination of electronic devices capable of executing computer readable program instructions. Server 140 may include components as depicted and described in further detail with respect to FIG. 4, in accordance with embodiments of the present invention.

Server 140 includes storage device 142, database 144, object 146, and index program 200. Storage device 142 can be implemented with any type of storage device, for example, persistent storage 405, which is capable of storing data that may be accessed and utilized by server 140 and client device 120, such as a database server, a hard disk drive, or a flash memory. In one embodiment storage device 142 can represent multiple storage devices within server 140. In various embodiments of the present invention storage device 142 stores a plurality of information, such as access statistics and object 146 in database 144. Database 144 may represent one or more organized collections of data stored and accessed from server 140.

In one embodiment, database 144 stores object 146, which can be utilized to train a machine learning algorithm. For example, database 144 may include a table (e.g., object 146) of data that can be used to train a machine learning algorithm. Generally, object 146 is any defined object in a database that is used to store or reference data. In an example embodiment, object 146 may include a histogram (i.e., a special column that provides detailed information about the data distribution in a table column). In another embodiment, data processing environment 100 can include additional servers (not shown) that host additional information that accessible via network 110.

In various embodiments of the present invention, index program 200 stores access data statistics corresponding to a row of an object of a database. In one embodiment, index program 200 adds one or more attributes to object 146. For example, index program 200 adds a column to a table of a database. In this example, the column may include a histogram, an integer that represents the cumulative number of times a record is accessed, and/or a time stamp corresponding to the most recent access of a record of the table.

In another embodiment, index program 200 determines a value for the one or more added attributes of object 146. For example, index program 200 identifies a structured query language (SQL) statement that includes modification operations (e.g., insert, update, append, etc.) or a SQL statement that includes reading data operations (e.g., select, scan, get, etc.). In this example, index program 200 can use a histogram to determine an integer value for the number of times a record of a table of a database is accessed. In another example, index program 200 stores a timestamp of a SQL statement to access a record of a table into a column of the table. In yet another embodiment, index program 200 determines a value of an attribute object 146. For example, index program 200 calculates a cumulative number of accesses of a column (e.g., attribute) of a table.

Generally, the purpose of the exponential decay function is to gradually reduce the influence of past accesses to a record on a cumulative access value. However, history of accesses of a record can provide vital insights as to the causes for trends in access statistics. For example, a first record of a table (e.g., object 146) is accessed (e.g., read) numerous times in one (1) hour and only a few times over multiple weeks (i.e., the first record is utilized to produce a periodic monthly report). Additionally, a second record of the table is accessed (e.g., read) numerous times during business hours (e.g., 9 AM-5 PM) and substantially less after business hours over a period of multiple weeks (i.e., the second record is utilized most frequently with respect to an aspect of a work related role of a user).

In yet another embodiment, index program 200 selects one or more rows of object 146 based on a determined value of the one or more added attributes. For example, index program 200 provides an additional clause to a query statement that organizes one or more records of a table according to access statistics (e.g., attribute value) of the one or more records. In this example, the table can include the one or more records organized in an ascending or descending order based on the access statistics the one or more records.

Figure 2:
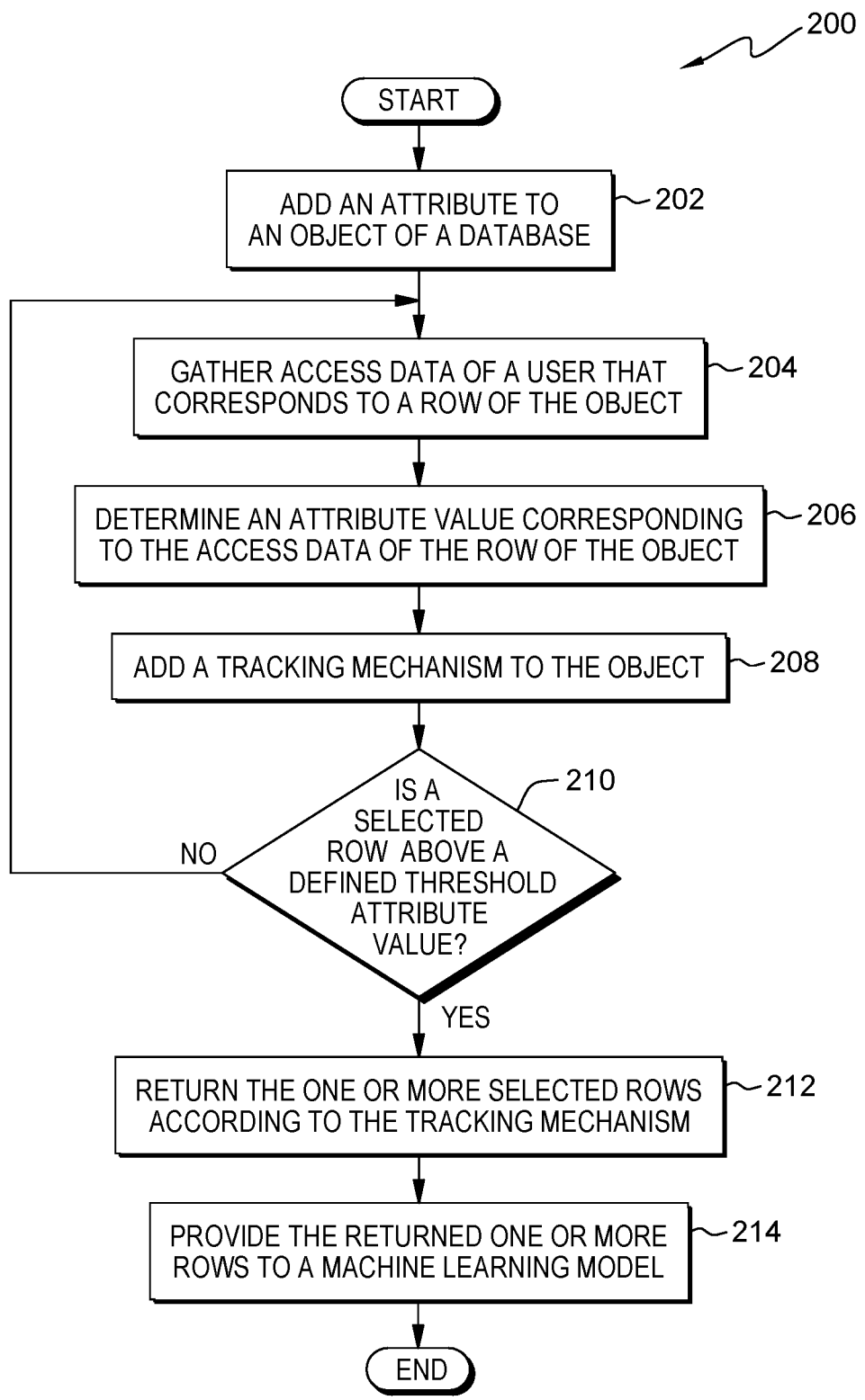
FIG. 2 is a flowchart depicting operational steps of a program, within the data processing environment of FIG. 1, for ordering rows of a table based on access statistics of the row of the table, in accordance with embodiments of the present invention.

FIG. 2 is a flowchart depicting operational steps of index program 200, a program for ordering rows of a table based on access statistics of the row of the table, in accordance with embodiments of the present invention. In one embodiment, index program 200 initiates in response to adding an attribute to object 146 of a server 140. In another embodiment, index program 200 continuously monitors object 146 for access data. For example, index program 200 monitors a table of a database for SQL statements that include DDL or DML, which index program 200 initiates in response to detecting.

In step 202, index program 200 adds an attribute to an object of a database. In one embodiment, index program 200 adds an attribute to object 146 of database 144. For example, index program 200 adds a column (e.g., attribute) to a table (e.g., object 146) of a database. In this example, index program 200 may include a tracking mechanism (e.g., index, clustering key, materialized view, etc.) in the column of the table. In another example, index program 200 modifies a table of a database to include additional columns. In another embodiment, index program 200 stores data access statistics of one or more records of object 146 in an added attribute of object 146 of database 144. For example, index program 200 stores a count of cumulative number of accesses of one or more rows of a table within a defined time period in an added column of the table. In another example, index program 200 stores a timestamp of the last access to one or more rows of a table in an added column of the table. In yet another example, index program 200 stores a histogram in an added column of the table, which holds access statistics for a defined period of time (e.g., a minute, an hour, a day, a week, a year, etc.).

Figure 3:
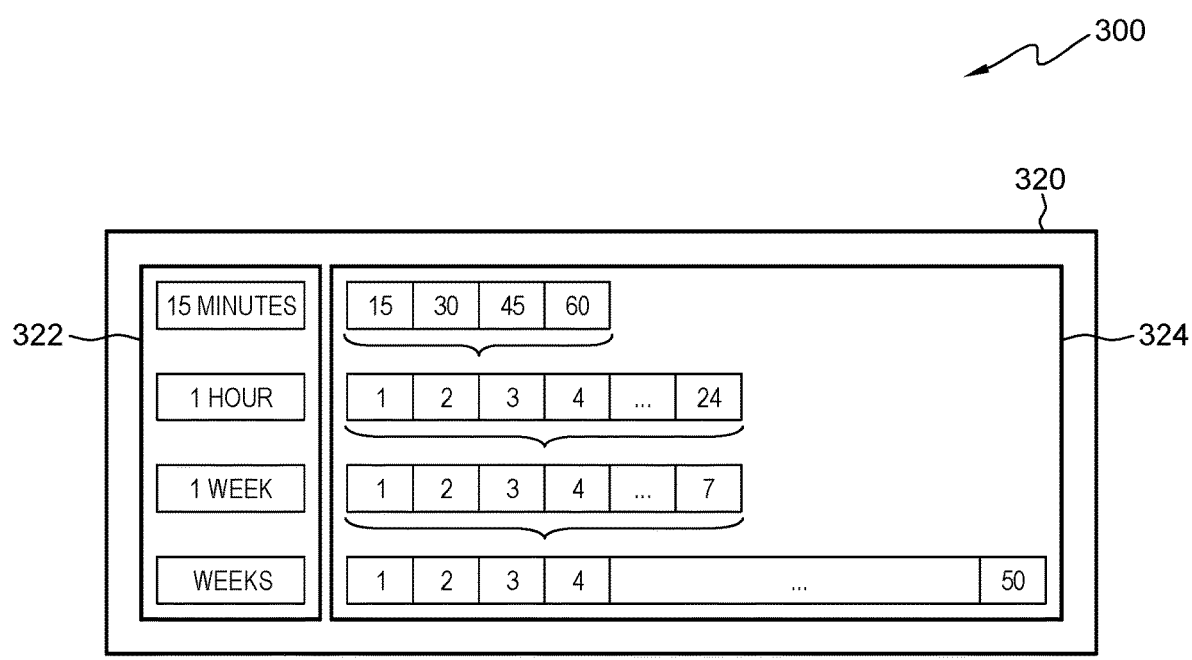
FIG. 3 is an example depiction of a cell of a given in a row of a table of a database that holds access statistics of a record for defined period of time, in accordance with embodiments of the present invention.

FIG. 3 is an example depiction of field 300, which is an example of a cell of a given in a row of a table of a database that holds access statistics of a record for defined period of time, that index program 200 utilizes to organize and/or store access statistics of records of object 146. Field 300 includes histogram 320, time range 322, and time slots 324. For example, histogram 320 is a binary object that is stored in field 300 of a table of a database 144.

In step 204, index program 200 gathers access data of a user that corresponds to a row of the object. Various embodiments of the present invention recognize that limitations exist in current methods as the current methods can only track access in a terms of creation and/or modification of data, whereas in the present invention access data that is tracked includes not only SQL statements that include modification operations, but also reading data operations. In one embodiment, index program 200 gathers access data of object 146 and stores the access data in an attribute of object 146. For example, index program 200 provides instructions to alter a table to enable access (e.g., modification and/or read operations, etc.) tracking of a record of the table of a database. In this example, index program 200 stores a time stamp of the most recent access of a record of a table in an added column of the table. In another embodiment, index program 200 monitors object 146 to detect one or more SQL statements database 144 receives corresponding to one or more rows of object 146 that include modification and/or reading operations and stores the statistics for a defined period of time in an attribute of object 146.

In an example embodiment, index program 200 uses histogram 320 to accumulate access statistics of a record of object 146 for a slot of time range 322. Time range 322 may be any defined time period, but in this example time range 322 includes ranges that cover fifteen (15) minute terms, one (1) hour terms, one (1) week terms, or one (1) month or year terms expressed in terms of weeks for collecting the number of accesses for the current term. Time slots 324 holds the number of access of a record in one of the four (4) fifteen (15) minute terms of time slot 324 to comprise one (1) hour for collecting access for the hour where a fifteen minute term holds the number of accesses of a record taken place in the fifteen minute term. For example, index program 200 may store one or more instance of a term of time slots 324 as a separate column, property or attribute in order to update one or more instance of time range 322.

In this example embodiment, index program 200 collects access statistics of the four (4) fifteen (15) minute times slots and flushes the collected statistics into a first one (1) hour slot of time slots 324 (i.e., removing the collected statistics from the fifteen minute slots and inputting the collected statistics into the first one hour slot). In this example, histogram 320 starts collecting access statistics at midnight and after a first fifteen (15) minute term histogram 320 stores the number of access corresponding to a record of object 146 and continues statistics gathering for a second fifteen (15) minute term. Additionally, after four (4) fifteen (15) minute terms index program 200 sums up the number of collected accesses (e.g., value, integer, etc.) and inputs the value into a first one (1) hour slot. Histogram 320 repeats the collection process until twenty-four (24) hours of cumulative statistics input into a first one (1) week slot, etc.

In step 206, index program 200 determines an attribute value that corresponds to the access data of the row of the object. In one embodiment, index program 200 determines a value of an attribute object 146. For example, index program 200 retrieves a cumulative number of accesses of one or more rows within a defined time period from an access statistics column that includes a histogram and assigns the one or more rows a value corresponding to the cumulative number of accesses. In another example, index program 200 retrieves a timestamp of a most recent access of a record from an access statistics column and assigns the record a value corresponding to the timestamp. In yet another example, index program 200 calculates a cumulative number (e.g., integer, value, etc.) of accesses of a record of a table, which includes a histogram in added column, using an exponential decay function:

$$N(t)=N_0 e^{-\lambda t}$$

where 'N(t)' denotes the quantity at time 't', '$N_0$' denotes the initial quantity, the quantity at time t=0, and '$\lambda$' denotes a decay constant. Generally, the purpose of the exponential decay function is to gradually reduce influence of past accesses to a record of a table on a cumulative access number. However, history of accesses to a record of a table may be valuable in a machine learning application (as discussed in step 214).

In step 208, index program 200 adds a tracking mechanism to the object. In one embodiment, index program 200 adds a tracking mechanism to object 146 to return and order one or more rows of object 146 based on access statistics data. For example, index program 200 modifies a table of a database to include a tracking mechanism (e.g., index, clustering key, materialized view, etc.) to retrieve one or more records from a table of a database. In this example, index program 200 uses the cumulative number of user accesses or a timestamp of the one or more records to order the one or more records in the tracking mechanism. Additionally, index program 200 utilizes preferences of a user to select a tracking mechanism for retrieving and ordering the one or more records. In another example, index program 200 creates a table in a database to include a tracking mechanism (e.g., index, clustering key, materialized view, etc.) to retrieve one or more records from a table of a database.

In an example embodiment, index program 200 selects an index-based tracking mechanism due to a storage preference of a user. Generally, performance of the index-based tracking mechanism is not optimal compared to other tracking mechanisms, but the index-based tracking mechanism utilizes less storage resources as compared to other training mechanisms. In this scenario, if index program 200 utilizes an index-based tracking mechanism to return and order one or more records of a table of a database according to access data statistics of an added column of the table, then index program 200 scans leaf nodes in an index and read blocks of a source table to return a record of the table, but this method may require index program 200 to repeat this process multiple times to return additional records from a block of the source table. Alternatively, index program 200 can read an entire table and sort one or more records of the table in memory, but either approach utilizes a considerable portion of computing resources.

In another example embodiment, index program 200 selects a clustering key-based tracking mechanism due to a performance preference of a user. Generally, the clustering key-based tracking mechanism is utilized to organize one or more rows in a table according to ascending or descending order. In this scenario, if index program 200 utilizes a clustering key-based tracking mechanism to return one or more records of a table of a database according to access data statistics of an added column of the table, then index program 200 retrieves the one or more selected records due to the clustering key-based tracking mechanism automatically ordering the one or more records in the table. Alternatively, if index program 200 modifies (e.g., adds a new row to an object) a table, then clustering degrades, which requires table rebuilds to restore the ordering of data (i.e., table rebuilds would be required as a result of ordering a table according to assess statistics).

In yet another example embodiment, index program 200 selects a materialized view-based tracking mechanism due to a reading performance preference of a user. Generally, the materialized view-based tracking mechanism is a virtual table that may be a local copy of a table stored remotely and/or a subset of one or more rows and/or columns of the table. In this example embodiment, index program 200 provides a view that includes a subset of one or more rows and columns ordered according to access statistic data of a source table of a database. Additionally, the view is updated automatically at a defined time period upon a modification of the source table.

In various embodiments of the present invention, index program 200 can temporarily disable and reenable gathering of access statistics of one or more rows of a table. In another embodiment, index program 200 disables gathering access statistics data of one or more rows of object 146. For example, index program 200 removes a tracking mechanism (e.g., index, clustering key, materialized view, etc.) that gathers access statistics data of one or more records from a table of a database. In this example, index program 200 may add the tracking mechanism to the table of the database after massive changes are performed on the one or more records of the table, which would negatively impact the accuracy of the access statistics data.

In decision step 210, index program 200 determines whether a selected row is above a defined threshold attribute value. In various embodiments of the present invention, index program 200 provides access data statistics of a row of a table of a NoSQL or SQL database to a user via an extension of SQL syntax. In one embodiment, index program 200 determines whether an attribute value of a row of object 146 is greater than a defined threshold value of a query. In this embodiment, index program 200 identifies the attribute value of the row of object 146. Additionally, index program 200 can compare the attribute value of the row to the defined threshold value of the query to determine whether to select the row of object 146.

In another aspect, index program 200 can also compare an attribute value of a first row of object 146 to an attribute value of a second row of object 146 to determine a rank of the first and second rows of object 146. For example, index program 200 disables gathering access statistics data of one or more records of a table and retrieves an access value (determined in step 206) from an added column of the table. In this example, index program 200 utilizes the access value to execute a query of a user. Additionally, index program 200 can allow a user to utilize one or more added columns of the table pseudo columns in a query (i.e., the additional columns are made visible to the user, which can also be used by machine learning algorithms, for example as a weight for data of one or more rows of the table).

In one scenario, index program 200 executes a query requesting a record of a table that is most frequently accessed by a user, compares an access value of one or more records the table, and determines which record of the table has the greatest access value in the table. In another scenario, index program 200 executes a query requesting a record of a table that a user most recently accessed, compares a last access timestamp of one or more records the table, and determines which record of the table has the most recent last access timestamp. In another scenario, index program 200 executes a query to remove ten (10) percent of records of a table that are the least recently accessed, compares and ranks a last access timestamp of one or more records the table, and deletes one or more records of the table (e.g., ten (10) least recently accessed records of the ranked one hundred (100) records of the table).

In another embodiment, if index program 200 determines that an attribute value of a row of object 146 is less than or equal to a defined threshold value of a query (decision step 210, "NO" branch), then index program 200 continues to gather access statistics data for one or more rows of object 146. For example, if index program 200 determines that an access value of one or more records the table is less than or equal to a $90^{th}$ percentile of records (e.g., defined threshold) of the table, then index program 200 deletes the one or more records from the table and reenables the gathering access statistics data of the table.

In decision step 212, index program 200 returns the one or more selected rows according to the tracking mechanism. In various embodiments of the present invention when index program 200 utilizes a query with a special additional clause that corresponds to a method of ordering the result of the query (e.g., one or more records of a table) based on attribute values of the added attributes (e.g., access statistic data columns), which the added attributes are not updated due to index program 200 using attribute values to order the result of the query because the query can be utilized to temporarily disable gathering access statistics.

More specifically, in response to index program 200 determining that an attribute value of a row of object 146 is greater than a defined threshold value of a query (decision step 210, "YES" branch), index program 200 reorders the one or more selected rows of object 146 and returns the one or more selected rows to client device 120. For example, if index program 200 determines that an access value of one or more records the table is greater than a $90^{th}$ percentile of records (e.g., defined threshold) of the table, then index program 200 selects the one or more records of the table and utilizes the access values of the one or more records to order and return the one or more records to the user. In another example, index program 200 utilizes the ranking of one or more records of the table to reorder the table (e.g., most frequently accessed records to least frequently accessed records).

In another example, index program 200 can gather access statistics data at the extend, block, or page level and organize the extends, blocks, or pages according to the corresponding access statistics data. In this example, index program 200 organizes extends, blocks, or pages so that the frequently accessed extends, blocks, or pages are first with the less frequently extends, blocks, or pages following. In one scenario, a table (e.g. object 146) is contained within a tablespace (e.g., database 144), which is comprised of many data files. In this scenario, index program 200 stores most frequently accessed extends to the fastest storage devices and the least used data of the table space can be put into files located on a slower storage device.

In step 214, index program 200 provides the returned one or more rows to a machine learning model. Generally, data quality and cleansing are vital with respect to training and increasing the efficiency and accuracy of machine learning algorithms. In one embodiment, index program 200 provides one or more rows of object 146 to a cognitive model. For example, index program 200 provides access data of a first record and a second record of a table of a database by a work computer (e.g., client device 120) of a user to a cognitive model as a training set. In this example, the first record is accessed numerous times in the last hour and a few times over a period of four (4) of weeks (e.g., the first record is used to produce some periodic monthly reports). Additionally, the second record is not accessed in the last three (3) hours but is repeatedly read (i.e., accessed) over a period of four (4) of weeks (e.g., the second record is used frequently during office hours but not at night). Furthermore, index program 200 allows a user to clean the training data prior to the table being input into the cognitive model or allow for the first and second records to have weights adjusted based on parameters of the cognitive model.

Figure 4:
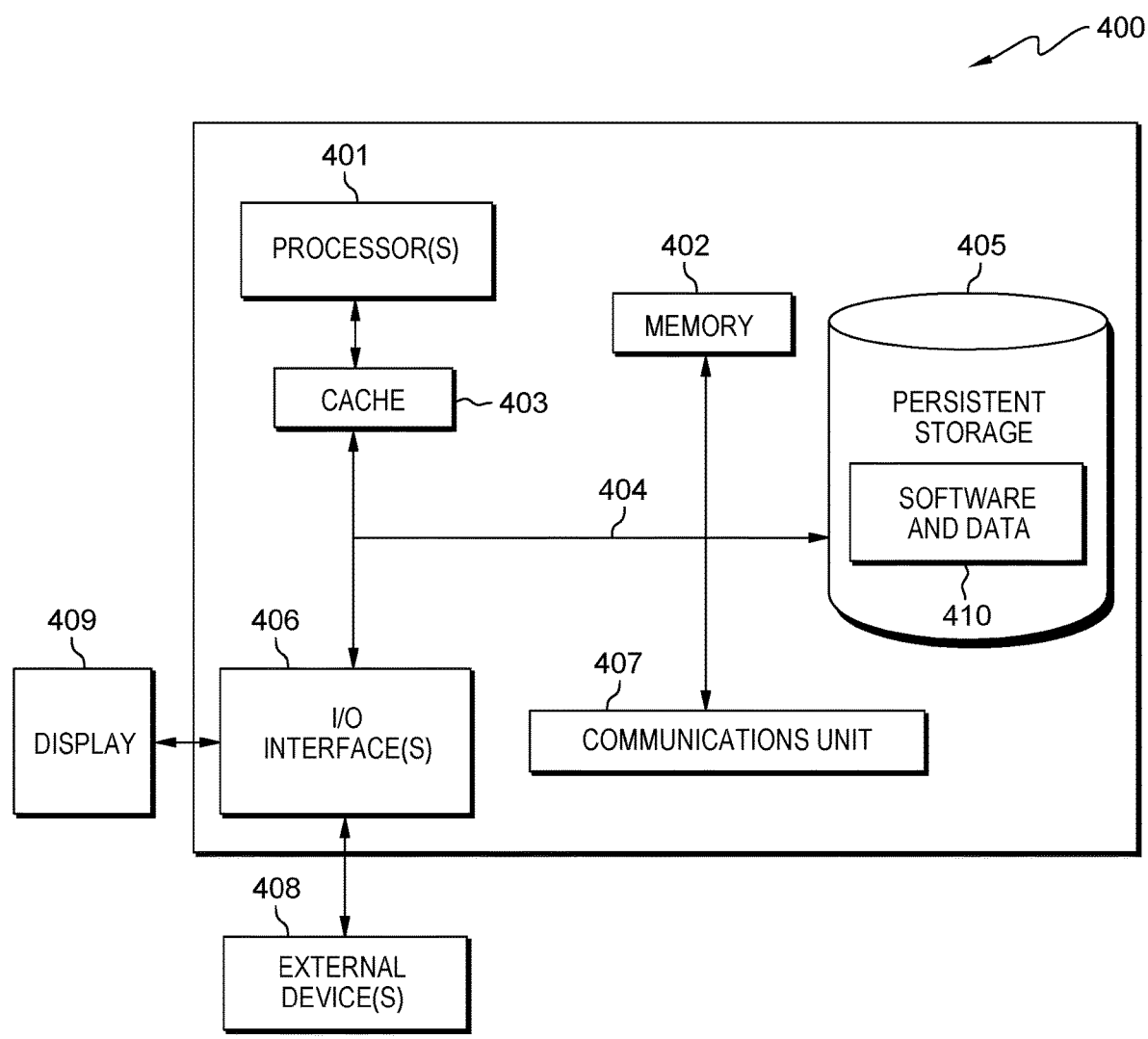
FIG. 4 is a block diagram of components of the client device and server of FIG. 1, in accordance with an embodiment of the present invention.

FIG. 4 depicts a block diagram of components of client device 120 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data 410) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 410 can be stored in persistent storage 405 for access and/or execution by one or more of the respective processor(s) 401 via cache 403. With respect to client device 120, software and data 410 includes data of user interface 122 and application 124. With respect to server 140, software and data 410 includes data of database 144, object 146, and index program 200.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., software and data 410) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., software and data 410) used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    adding, by one or more processors, an attribute to each respective instance of a set of rows within a table of a database;
    adding, by one or more processors, a respective tracking mechanism to the attribute of each respective instance of the set of rows of the table of the database;
    gathering, by one or more processors, access data of the respective tracking mechanism of the attribute of each respective instance of the set of rows of the table of the database;
    determining, by one or more processors, an attribute value that corresponds to the gathered access data of the respective tracking mechanism of the attribute of each respective instance of the set of rows of the table of the database, wherein determining the attribute value that corresponds to the gathered access data, further comprises:
        determining, by one or more processors, a cumulative attribute value for each respective instance of the set of rows of the table of the database based at least in part on an exponential decay function and the gathered access data;
    ordering, by one or more processors, each respective instance of the set of rows of the table based at least in part on the respective instances of the attribute values; and
    storing, by one or more processors, a row of the set of rows of the table in a storage device of the database based at least in part on the cumulative attribute value and capabilities of the storage device.

2. The method of claim 1, further comprising:
    providing, by one or more processors, a query, the query including a clause of a defined threshold attribute value; and
    selecting, by one or more processors, a first row of each respective instance of the set of rows of the table of the database based at least in part on an attribute value of the first row, wherein the attribute value of the first row is greater than the defined threshold attribute value of the query.

3. The method of claim 1, wherein gathering access data of the respective tracking mechanism of the attribute of each respective instance of the set of rows of the table of the database, further comprises:
    identifying, by one or more processors, an access to each respective instance of a set of rows of the table of the database, wherein the identified access includes an executed database command instruction that includes a selection from a group consisting of: modification functions, creation functions, and reading functions.

4. The method of claim 1, wherein adding the respective tracking mechanism to of the attribute of each respective instance of the set of rows of the table of the database, further comprises:

modifying, by one or more processors, the attribute of each respective instance of the set of rows within the table of the database to include a histogram; and selecting, by one or more processors, the respective tracking mechanism from a group consisting of: index, clustering key, and materialized view.

5. The method of claim 2, wherein selecting the first row of each respective instance of the set of rows of the table of the database based at least in part on the attribute value of the first row, further comprises:

disabling, by one or more processors, temporarily, gathering of the access data of each respective instance of the set of rows within the table of the database;

determining, by one or more processors, whether an attribute value of each respective instance of the set of rows within the table of the database is less than or equal to the defined threshold attribute value of the query; and removing, by one or more processors, each respective instance of the set of rows within the table of the database that are less than or equal to the defined threshold attribute value of the query.

6. The method of claim 1, further comprising:

storing, by one or more processors, a first table of the database that includes each respective instance of the set of rows within the first table with an attribute value above a defined threshold attribute value in a first storage device with a high bandwidth rating; and storing, by one or more processors, a second table of the database that includes each respective instance of the set of rows within the first table with corresponding an attribute value below the defined threshold attribute value in a second storage device with a low bandwidth rating.

7. The method of claim 1, wherein ordering each respective instance of the set of rows of the table based at least in part on each respective instance of the attribute values, further comprises:

modifying, by one or more processors, an order of one or more rows of the table of the database, wherein the basis of the order of the one or more rows of the table is selected from a group consisting of: determined attribute value, cumulative number of accesses, and time stamp of the last access.

8. A computer program product comprising:

one or more computer readable storage media and program instructions stored on the one or more computer readable storage media, the program instructions comprising:

program instructions to add an attribute to each respective instance of a set of rows within a table of a database;

program instructions to add a respective tracking mechanism to the attribute of each respective instance of the set of rows of the table of the database;

program instructions to gather access data of the respective tracking mechanism of the attribute of each respective instance of the set of rows of the table of the database;

program instructions to determine an attribute value that corresponds to the gathered access data of the respective tracking mechanism of the attribute of each respective instance of the set of rows of the table of the database, wherein determining the attribute value that corresponds to the gathered access data, further comprises:

program instructions to determine a cumulative attribute value for each respective instance of the set of rows of the table of the database based at least in part on an exponential decay function and the gathered access data;

program instructions to order each respective instance of the set of rows of the table based at least in part on each respective instance of the attribute values; and program instructions to store a row of the set of rows of the table in a storage device of the database based at least in part on the cumulative attribute value and capabilities of the storage device.

9. The computer program product of claim 8, further comprising program instructions, stored on the one or more computer readable storage media, to:

provide a query, the query including a clause of a defined threshold attribute value; and select a first row of each respective instance of the set of rows of the table of the database based at least in part on an attribute value of the first row, wherein the attribute value of the first row is greater than the defined threshold attribute value of the query.

10. The computer program product of claim 8, wherein program instructions to gather access data of the respective tracking mechanism of the attribute of each respective instance of the set of rows of the table of the database, further comprise program instructions to:

identify an access to each respective instance of a set of rows of the table of the database, wherein the identified access includes an executed database command instruction that includes a selection from a group consisting of: modification functions, creation functions, and reading functions.

11. The computer program product of claim 8, wherein program instructions to add the respective tracking mechanism to of the attribute of each respective instance of the set of rows of the table of the database, further comprise program instructions to:

modify the attribute of each respective instance of the set of rows within the table of the database to include a histogram; and select the respective tracking mechanism from a group consisting of: index, clustering key, and materialized view.

12. The computer program product of claim 9, wherein program instructions to select the first row of each respective instance of the set of rows of the table of the database based at least in part on the attribute value of the first row, further comprise program instructions to:

disable temporarily, gathering of the access data of each respective instance of the set of rows within the table of the database;

determining whether an attribute value of each respective instance of the set of rows within the table of the database is less than or equal to the defined threshold attribute value of the query; and removing, each respective instance of the set of rows within the table of the database that are less than or equal to the defined threshold attribute value of the query.

13. The computer program product of claim 8, further comprising program instructions, stored on the one or more computer readable storage media, to:

store a first table of the database that includes each respective instance of the set of rows within the first table with an attribute value above a defined threshold attribute value in a first storage device with a high bandwidth rating; and store a second table of the database that includes each respective instance of the set of rows within the first table with corresponding an attribute value below the defined threshold attribute value in a second storage device with a low bandwidth rating.

14. The computer program product of claim 8, wherein program instructions to order each respective instance of the set of rows of the table based at least in part on each respective instance of the attribute values, further comprise program instructions to:
modify an order of one or more rows of the table of the database, wherein the basis of the order of the one or more rows of the table is selected from a group consisting of: determined attribute value, cumulative number of accesses, and time stamp of the last access.

15. A computer system comprising:
one or more computer processors;
one or more computer readable storage media; and
program instructions stored on the computer readable storage media for execution by at least one of the one or more processors, the program instructions comprising:
program instructions to add an attribute to each respective instance of a set of rows within a table of a database;
program instructions to add a respective tracking mechanism to the attribute of each respective instance of the set of rows of the table of the database;
program instructions to gather access data of the respective tracking mechanism of the attribute of each respective instance of the set of rows of the table of the database;
program instructions to determine an attribute value that corresponds to the gathered access data of the respective tracking mechanism of the attribute of each respective instance of the set of rows of the table of the database, wherein determining the attribute value that corresponds to the gathered access data, further comprises:
program instructions to determine a cumulative attribute value for each respective instance of the set of rows of the table of the database based at least in part on an exponential decay function and the gathered access data;
program instructions to order each respective instance of the set of rows of the table based at least in part on each respective instance of the attribute values; and
program instructions to store a row of the set of rows of the table in a storage device of the database based at least in part on the cumulative attribute value and capabilities of the storage device.

16. The computer system of claim 15, further comprising program instructions, stored on the one or more computer readable storage media for execution by at least one of the one or more processors, to:
provide a query, the query including a clause of a defined threshold attribute value; and
select a first row of each respective instance of the set of rows of the table of the database based at least in part on an attribute value of the first row, wherein the attribute value of the first row is greater than the defined threshold attribute value of the query.

17. The computer system of claim 15, wherein program instructions to gather access data of the respective tracking mechanism of the attribute of each respective instance of the set of rows of the table of the database, further comprise program instructions to:
identify an access to each respective instance of a set of rows of the table of the database, wherein the identified access includes an executed database command instruction that includes a selection from a group consisting of: modification functions, creation functions, and reading functions.

18. The computer system of claim 15, wherein program instructions to add the respective tracking mechanism to of the attribute of each respective instance of the set of rows of the table of the database, further comprise program instructions to:
modify the attribute of each respective instance of the set of rows within the table of the database to include a histogram; and
select the respective tracking mechanism from a group consisting of: index, clustering key, and materialized view.

19. The computer system of claim 16, wherein program instructions to select the first row of each respective instance of the set of rows of the table of the database based at least in part on the attribute value of the first row, further comprise program instructions to:
disable temporarily, gathering of the access data of each respective instance of the set of rows within the table of the database;
determining whether an attribute value of each respective instance of the set of rows within the table of the database is less than or equal to the defined threshold attribute value of the query; and
removing, each respective instance of the set of rows within the table of the database that are less than or equal to the defined threshold attribute value of the query.

20. The computer system of claim 15, further comprising program instructions, stored on the one or more computer readable storage media for execution by at least one of the one or more processors, to:
store a first table of the database that includes each respective instance of the set of rows within the first table with an attribute value above a defined threshold attribute value in a first storage device with a high bandwidth rating; and
store a second table of the database that includes each respective instance of the set of rows within the first table with corresponding an attribute value below the defined threshold attribute value in a second storage device with a low bandwidth rating.

* * * * *